(12) United States Patent
Stevenson

(10) Patent No.: US 6,471,616 B2
(45) Date of Patent: Oct. 29, 2002

(54) POWER TRANSMISSION WITH FRICTION LAUNCH TORQUE TRANSMITTING MECHANISM IN FORWARD AND REVERSE

(75) Inventor: Paul Dwight Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 1 day.

(21) Appl. No.: 09/782,881

(22) Filed: Feb. 15, 2001

(65) Prior Publication Data

US 2002/0111246 A1 Aug. 15, 2002

(51) Int. Cl.⁷ .............................. F16H 3/68; F16H 3/44
(52) U.S. Cl. ........................ 475/296; 475/275; 475/288
(58) Field of Search ................................. 475/296, 275, 475/280, 288, 311, 313

(56) References Cited

U.S. PATENT DOCUMENTS

| | | | |
|---|---|---|---|
| 5,122,103 A | * 6/1992 | Nakawaki et al. | 475/278 |
| 5,435,792 A | * 7/1995 | Justice et al. | 475/276 |
| 5,809,442 A | * 9/1998 | Schulz et al. | 701/51 |
| 6,071,208 A | 6/2000 | Koivunen | 475/275 |
| 6,278,926 B1 | * 8/2001 | Jain et al. | 701/58 |

* cited by examiner

Primary Examiner—Sherry Estremsky
Assistant Examiner—Tisha D. Lewis
(74) Attorney, Agent, or Firm—Leslie C. Hodges

(57) ABSTRACT

A powertrain includes a power transmission having an input shaft continuously connected directly between an engine and a planetary gear member of a first planetary gear set. Another member of the planetary gear set is selectively grounded by a torque transmitting mechanism to establish a reaction member during the launch of a vehicle incorporating the powertrain. The reaction member is established during both the lowest forward drive ratio and the reverse drive ratio. A third member of the planetary gear set transmits the torque from the input shaft, as modified by the planetary gear set, to other planetary gear sets in down stream power flow arrangement with the first planetary gear set. The torque transmitting mechanism grounding the reaction member of the first planetary gear set is preferably a brake having two half bands.

3 Claims, 3 Drawing Sheets

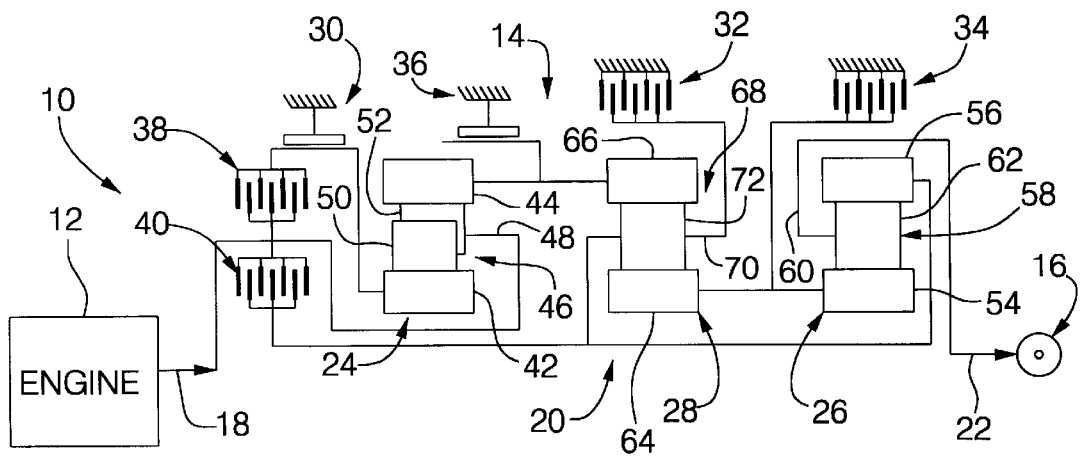
FIG. 1
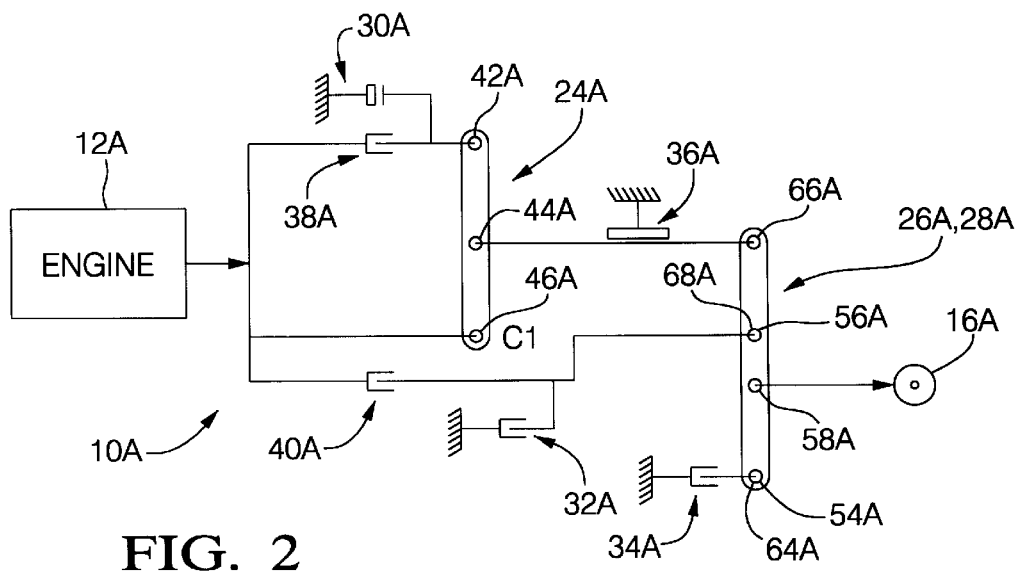
FIG. 2
| GEAR | RATIO | STEP | 38 | 40 | 34 | 32 | 30 | 36 |
|------|-------|------|----|----|----|----|----|----|
| Rev | -2.54 | 0.70 | | | | X | G | |
| Nev | | | | | | | | |
| 1st | 3.64 | | | | X | | G | |
| 2 nd | 2.06 | 1.77 | X | | X | | | |
| 3 rd | 1.44 | 1.43 | | X | X | | | |
| 4 th | 1.00 | 1.44 | X | X | | | | |
| 5 th | 0.77 | 1.30 | | X | | | X | |
| 6 th | 0.59 | | | X | | | | X |
| OAR | 6.18 | | R1/S1 2.30 | | R2/S2 2.30 | | R3/S3 2.30 | |
FIG. 3

POWER TRANSMISSION WITH FRICTION LAUNCH TORQUE TRANSMITTING MECHANISM IN FORWARD AND REVERSE

TECHNICAL FIELD

This invention relates to automatic shifting power transmissions and more particularly to power transmissions having a single torque transmitter operable to selectively actuated to complete both forward and reverse drives.

BACKGROUND OF THE INVENTION

In automatic shifting power transmissions it is common practice to install a hydrodynamic fluid drive, such as a torque converter, between the power source (engine) and a multi-speed gear configuration, such as a planetary gear arrangement. The torque converter (TC) provides a torque multiplier between the engine and the gearing to improve the vehicle launch performance. The torque ratio of the TC is generally in the range of 1.60 to 3.3 depending on the particular application. As is well-known, the TC is a slipping device that has a high efficiency loss at vehicle launch. This loss decreases, but continues, as the TC approaches a 1.0 to 1.0 speed ratio at high speed and low torque. In recent times, a torque converter clutch has been added to most transmissions to effectively remove the TC from the power path and thereby improve the overall efficiency of the transmission.

Other considerations have been given to improving the overall efficiency of the transmission. For example, the use of a starting clutch in lieu of a TC has been suggested and in some instances utilized. The advent of electronic controls improves the operation of a starting clutch as a vehicle launch device. The clutch is, however, a rotating device with all of the complexities associated with such a device. The control needs considerable accuracy to insure consistent fill times, and to compensate for variable fluid leaks at the rotating shaft seals. This requires accurate hydraulic flow volumes and pressure control over a wide range of operating requirements. Also the use of a starting clutch merely replaces one rotating mechanism with another, albeit a more efficient mechanism. There is only slight axial space saving and perhaps more complex control features.

SUMMARY OF THE INVENTION

It is an object of the present invention to provide a power transmission with an improved friction launch mechanism.

In one aspect of the present invention, a selectively operable torque transmitting mechanism is engaged to initiate both forward and reverse operation in a power transmission. In another aspect of the present invention, the torque transmitting mechanism controls the torque transmitting operation of one planetary gear member of a ratio planetary gear set in a multi-speed power transmission. In yet another aspect of the present invention, the planetary gear member has the same directional sense during launch in both the forward and reverse operation.

In still another aspect of the present invention, the torque transmitting mechanism is a stationary reaction member. In a further aspect of the present invention, the torque transmitting mechanism does not apply an unbalanced radial force to the planetary gear member. In yet a further aspect of the present invention, the torque transmitting mechanism utilizes half wrap bands with a double servo to reduce the radial forces and decrease the sensitivity of the torque transmitting mechanism to changes in the coefficient of friction.

BRIEF DESCRIPTION OF THE DRAWINGS

FIG. 1 is a schematic representation of a multi-speed planetary gear arrangement in a power transmission incorportating the present invention.

FIG. 2 is a lever diagram of the planetary gear arrangement shown in FIG. 1.

FIG. 3 is a truth table chart describing the gear ratios and torque transmitting mechanism engagement schedule for the planetary gear arrangement shown in FIG. 1.

DESCRIPTION OF AN EXEMPLARY EMBODIMENT

Figure 4:
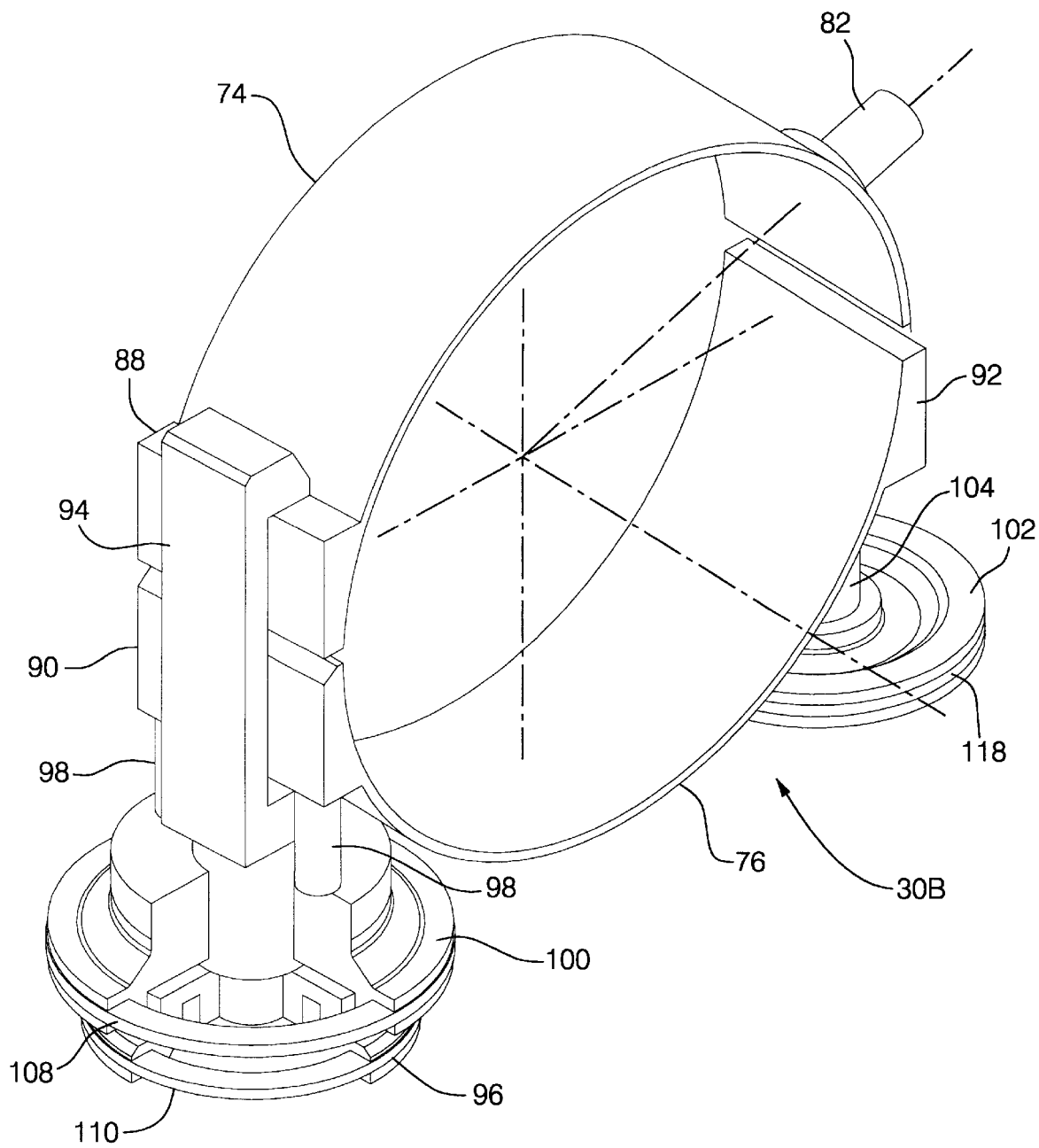
FIG. 4 is an isometric view of a torque transmitting mechanism utilized with the present invention.

A powertrain 10 has a power source, such as a conventional internal combustion engine 12, a multi-speed planetary transmission 14, and a conventional final drive mechanism 16. The planetary transmission 14 includes an input shaft 18, connected directly with the engine 12, a multi-speed planetary gear arrangement 20, and a output shaft 22 connected directly with the final drive mechanism 16. The planetary gear arrangement has a compound planetary gear set 24, two simple planetary gear sets 26 and 28, four selectively engageable stationary rotating torque transmitting mechanisms 30, 32, 34, and 36, and two selectively engageable rotating torque transmitting mechanisms 38 and 40.

The rotating torque transmitting mechanisms 38 and 40 are conventional fluid operated clutch assemblies, the construction of which is well-known in the art of power transmissions. The stationary rotating torque transmitting mechanisms 32 and 34 are conventional fluid operated brake assemblies of either friction plate type or band plate type. The stationary torque transmitting mechanism 36 is preferably a band type brake assembly. The stationary torque transmitting mechanism 30 is a band type brake and preferably a split half-band type 30B as shown in FIG. 4. The reason for this type of brake assembly will become more apparent in the following description. The rotating torque transmitting mechanisms are controlled in engaged and disengaged states by a conventional electro-hydraulic mechanism, not shown, which includes a hydraulic valving arrangement and an electronic control unit (ECU) that incorporates a conventional programmable digital computer. The rotating torque transmitting mechanisms are engaged and disengaged in accordance with performance and operating signals such as engine speed, vehicle speed, and engine torque to name a few. Those familiar with the art of transmission control will be familiar with the many features and functions that are available with electronic controls.

The planetary gear set 24, which is similar to that shown in U.S. Pat. No. 6,071,208 issued to Kouvunen Jun. 6, 2000, has a sun gear member 42, a ring gear member 44, and a planet carrier assembly member 46 that includes a spider or cage 48 rotatably mounting a plurality of intermeshing pinion gears 50 and 52 disposed in meshing relation with the sun gear member 42 and the ring gear member 44, respectively. The planet carrier assembly member 46 is continually drivingly connected with the engine 12 through the input shaft 18. The sun gear member 42 is operatively connected with the stationary torque transmitting mechanism 30 and the rotating torque transmitting mechanism 38. The ring gear member 44 is operatively connected with the stationary torque transmitting mechanism 36. When the stationary torque transmitting mechanism 30 is selectively engaged, the sun gear member 42 is held stationary and when the torque transmitting mechanism 38 is selectively engaged, the sun gear member 42 is connected directly with the engine 12 through the input shaft 18, or with a vibration isolator or damper connected between the engine 12 and the shaft 18. When the torque transmitting mechanism 36 is selectively engaged, the ring gear member 44 is held stationary.

The planetary gear set 26 has a sun gear member 54, a ring gear member 56 and a planet carrier assembly 58 which includes a cage or spider 60 that rotatably mounts a plurality of pinion gears 62 disposed in meshing relationship with both the sun gear member 54 and the ring gear member 56. The ring gear member 56 is operatively connected with the torque transmitting mechanism 40. The planet carrier assembly member 58 is continually drivingly connected with the output shaft 22. The sun gear member 54 is continuously connected with a sun gear member 64 of the planetary gear set 28. Both sun gear members 54 and 64 are operatively connected with the torque transmitting mechanism 34 which, when engaged will hold the sun gear members 54 and 64 stationary. When the torque transmitting mechanism 40 is engaged, the ring gear member 56 will rotate in unison with the engine 12 through the input shaft 18.

The planetary gear set 28 also has a ring gear member 66 and a planet carrier assembly member 68 that includes a spider or cage 70 on which is rotatably mounted a plurality of pinion gears 72 that are disposed in meshing relation with both the sun gear member 64 and the ring gear member 66. The ring gear member 66 is continuously connected with the ring gear member 44 of planetary gear set 24, and operatively connected with the torque transmitting mechanism 36. The planet carrier assembly member 68 is operatively connected with torque transmitting mechanism 32 and the torque transmitting mechanism 40. When the torque transmitting mechanism 36 is selectively engaged, both ring gear members 66 and 44 will be held stationary. When the torque transmitting mechanism 40 is selectively engaged, the planet carrier assembly member 68 will rotate in unison with the engine 12 through the input shaft 18 and also with the ring gear member 56. When the torque transmitting mechanism 32 is selectively engaged, the planet carrier assembly member 68 and the ring gear member 56 will be held stationary.

In FIG. 2, a lever diagram 10A depicts the powertrain 10 in a modified form. The corresponding members of the lever diagram 10A will be given the same numeric designation as the members of the powertrain 10 with an A suffix. For example, the lever 24A represents the planetary gear set 24 and the node 42A represents the sun gear member 42. The planetary gear sets 26 and 28 are combined as a single lever with the designation 26A, 28A. The portion 26A consists of nodes 54A, 56A, and 58A; the portion 28A consists of nodes 64A, 66A, and 68A. As is apparent from FIG. 1, these simple planetary gear sets 26 and 28 are joined at two members, namely sun gear members 54 and 64 and ring gear member 56 and planet carrier assembly member 68. Thus, the lever 26A, 28A has two nodes with dual designations.

During operation of the transmission, a neutral condition is established by disengaging all of the torque transmitting mechanisms. To establish a reverse drive ratio, the torque transmitting mechanism 32 is fully engaged and the torque transmitting mechanism 30 is engaged under controlled conditions dependent on the signals received by the ECU. The torque transmitting mechanism 32 establishes both the planet carrier assembly member 68 and the ring gear member 56 as reaction members in their respective planetary gear sets 28 and 26. To provide a controlled launch, the torque transmitting mechanism 32 is fully engaged prior to the initiation of engagement of the torque transmitting mechanism 30. The torque transmitting mechanism 30 is a launch device for the reverse drive ratio. The controlled engagement of the torque transmitting mechanism 30 results in a controlled launch or acceleration of the vehicle in which the powertrain is installed. The ratio thus established is also referred to as the reverse launch ratio. It can be readily seen from the planetary gear arrangement 14 in FIG. 1 that the sun gear member 42 is a reaction member and the planet carrier member 46 is an input member. With this arrangement, the ring gear member 44 will be driven forwardly, engine rotation direction, at a reduced speed. The lever diagram 10A depicts the same operation. The node 42A is held stationary by the torque transmitting mechanism 30A and the node 46A is urged rightward, engine input direction, which results in the node 44A being urged rightward. The lever 26A, 28A has the node 56A, 68A grounded by the torque transmitting mechanism 32A and the node 66A is urged rightward by the node 44A. With this action, the output node 58A is urged leftward such that a reverse operation is attained. The reverse drive ratio is affected by all three of the planetary gear sets 24, 26, and 28.

To establish the first forward drive ratio from the neutral condition, the torque transmitting mechanism 34 is fully engaged and the torque transmitting mechanism 30 is engaged under controlled conditions depending on the commands from the operator as interpreted by the ECU. The ratio thus established is also designated as the forward launch ratio. The torque transmitting mechanism 34 establishes both the sun gear member 64 and the sun gear member 54 as reaction members in their respective planetary gear sets 28 and 26. To provide a controlled launch, the torque transmitting mechanism 34 is fully engaged prior to the initiation of engagement of the torque transmitting mechanism 30. The torque transmitting mechanism 30 is a launch device during the first forward drive ratio. As the torque transmitting mechanism 30 is engaged, the vehicle will accelerate in a controlled fashion. As evident from FIG. 2, the node 42A is a reaction point, the node 46A is an input point, and the node 44A is urged rightward. The node 54A, 64A of the lever 26A, 28A is held stationary by the torque transmitting mechanism 34A and the node 66A is an input node. The output node 58A is urged rightward at a reduced speed value. As with the reverse drive ratio, the first forward drive ratio utilizes all three of the planetary gear sets 24, 26, and 28.

To establish the second forward ratio, the torque transmitting mechanism 30 is disengaged and the torque transmitting mechanism 38 is engaged while the torque transmitting mechanism 34 remains engaged. This establishes the planetary gear set 24 (lever 24A) in a one to one (direct) relation and imposes the engine input on the ring gear member 66 (node 66A). The sun gear members 54, 64 (node 54A, 64A) are held stationary to be established as reaction members in the planetary gear arrangement 14. The planet carrier assembly member 58 (node 58A) is the output member which is driven forwardly at a reduced speed. The second forward ratio is determined by the planetary gear sets 26 and 28.

The third forward drive ratio is established by releasing the torque transmitting mechanism 38 and engaging the torque transmitting mechanism 40. This completes a ratio interchange from the second forward ratio to the third forward ratio. The engagement of the torque transmitting mechanism 40 establishes the ring gear member 56 (node 56A) as an input member and the sun gear member 54 (node 54A) remains as a reaction member. The planetary gear set 26 (lever 26A) is conditioned as an underdrive such that the planet carrier assembly member 58 (node 58A) rotates forwardly at a reduced speed relative to the ring gear member 56.

To establish the fourth forward drive ratio, during a ratio interchange from third to fourth, the torque transmitting mechanism 34 is disengaged and the torque transmitting mechanism 38 is engaged while the torque transmitting mechanism 40 remains engaged. This places the planetary gear set 24 (node 24A), the planetary gear set 28 (node 28A), and the planetary gear set 26 (node 26A) all in a one to one direct drive relation. Thus the input shaft 18 and the output shaft 22 rotate in unison with the engine 12.

To establish the fifth forward drive ratio with an interchange from the fourth forward drive ratio, the torque transmitting mechanism 38 is disengaged and the torque transmitting mechanism 30 is engaged while the torque transmitting mechanism 40 remains engaged. This conditions the sun gear member 42 (node 42A) as a reaction member and both of the planet carrier assembly member 46 (node 46A) and ring gear member 56 (node 56A) as input members. The ring gear member 66 (node 66A) is also driven forwardly. It can be seen in FIG. 2 that a forward component of less than unity at the node 66 and a unity input component (engine speed) at the node 56A, 68A will result in an overdrive output at the node 58A. The fifth forward drive ratio is determined by all three of the planetary gear sets 24, 26, and 28.

To establish the sixth (highest) forward drive ratio with an interchange from the fifth forward ratio, the torque transmitting mechanism 30 is disengaged while the torque transmitting mechanism 36 is engaged and the torque transmitting mechanism 40 remains engaged. This results in the ring gear member 66 (node 66A) becoming a reaction member and both the planet carrier assembly member 68 (node 68A) and the ring gear member 56 (node 56A) as unity input members. The sun gear members 54 and 64 (node 54A, 64A) are driven forwardly at an overdrive ratio determined by the planetary gear sets 26 and 28 (lever 26A and 28A). As can be seen in FIG. 2, a ground at node 66A and a unity input at node 56A will result in an overdrive output at the node 58A and therefore the output shaft 22. The sixth forward drive ratio is determined by the planetary gear sets 26 and 28 (lever 26A, 28A).

The truth table chart in FIG. 3 provides one set of drive ratios that are possible with the above described planetary gear arrangement 14 as well as the engagement schedule followed to establish the drive ratios. These ratios are determined with a ring gear to sun gear ratios (R1/S1, R2/S2, and R3/S3) being identical and having a value of 2.30. In the truth table, the designation X indicates that a torque transmitting mechanism is engaged and the designation G indicates that the torque transmitting mechanism is engaged to be a vehicle launch or garage shift device. Only the torque transmitting mechanism 30 is used as a vehicle launch device. It should be noted that all sequential upshifts and downshifts are single transition interchanges. It should also be noted that a first to third, second to fourth, third to fifth or sixth and fourth to sixth skip shifts are also single transition shifts. The overall forward ratio coverage (OAR) is 6.18 which is well within good design criteria as is the forward to reverse step of 0.70. The first forward ratio and reverse ratio, when combined with conventional final drive ratios will permit the transmission to operate very well without the benefit of a hydrodynamic drive assembly being positioned between the engine 12 and the input shaft 18.

As previously mentioned, the sun gear member 42 is the reaction member for both the forward launch ratio (first ratio) and for the reverse launch ratio. As will be evident to those skilled in the art, the torque reaction at the sun gear member 42 is less than the engine torque during the first and reverse ratios and the directional sense of the torque reaction is in the same direction. With this arrangement, the energizing and de-energizing direction of rotation for a band type device does not have to be considered since the direction of energization is identical and the torque value, relative to engine torque input is the same. The use of a high speed, low torque reaction band and drum assembly allows better control and improved cooling while under a torque load.

Figure 5:
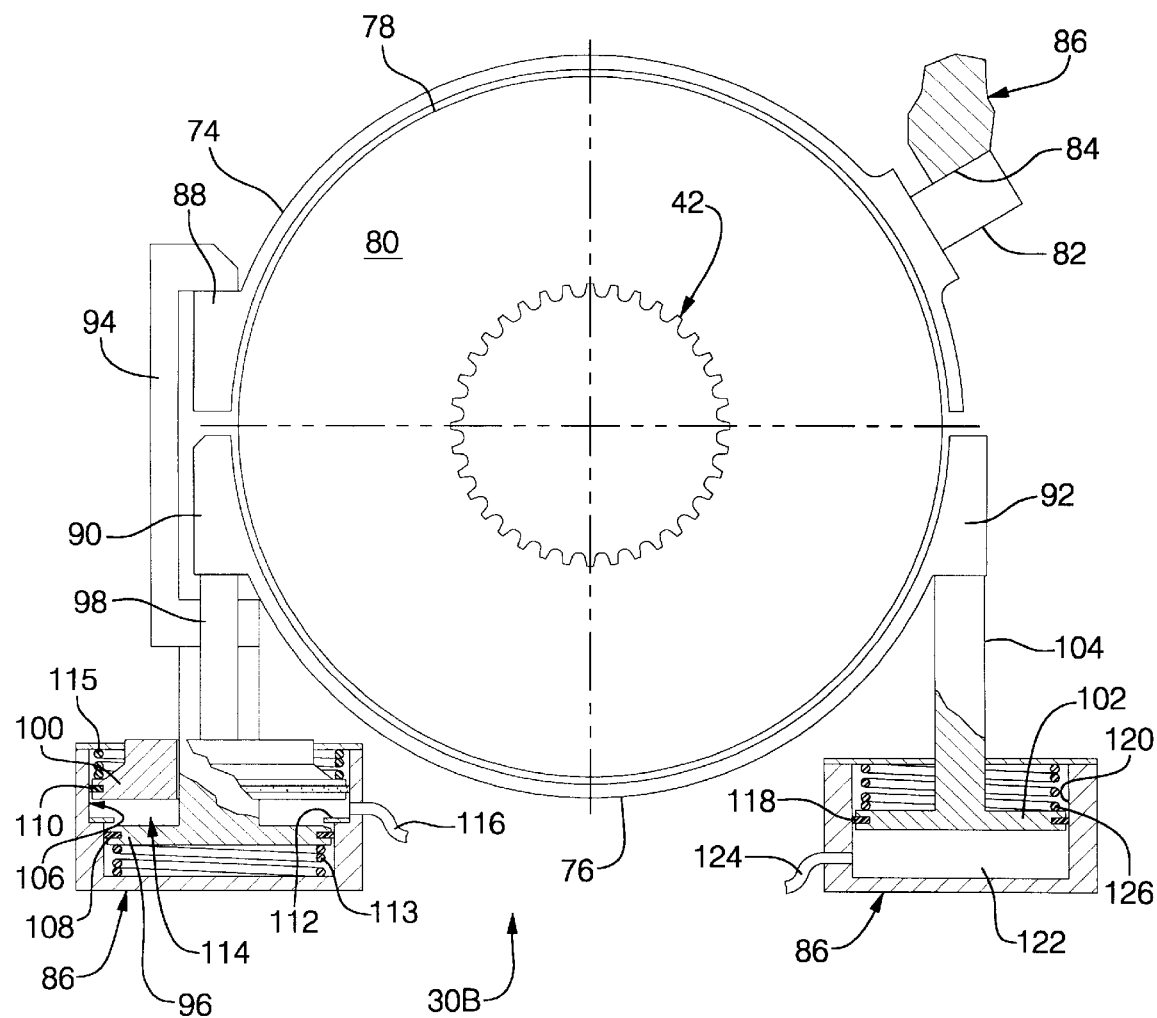
FIG. 5 is an elevational view of the torque transmitting mechanism shown in FIG. 4.

Referring to FIGS. 4 and 5, the torque transmitting mechanism 30B has two half bands 74 and 76, each of which will frictionally engage a drum 78. The sun gear member 42 is secured to or integral with a hub 80 of the drum 78. The half band 74 has a pintle 82 formed one end thereof which pintle 82 is fitted into a socket or seat 84 formed in a transmission housing 86. The half band 74 has an anchor 88 formed on the other end thereof. The half band 76 has anchors 90 and 92 formed on opposite ends. The anchor 88 is operatively connected with a rod 94 that is secured to a piston 96. The anchor 90 is operatively connected with a pair of rods 98 which are operatively connected with a piston 100. The anchor 92 is operatively connected with a piston 102 through a rod 104.

The pistons 96 and 100 are slidably disposed in a stepped bore 106 formed in the transmission housing 86. The pistons 96 and 100 have respective annular seals 108 and 110 attached thereto for sealingly engaging the stepped bore 106. A locating ring 112 is secured in the stepped bore to maintain the pistons properly positioned in the bore 106 such that a cavity 114 is formed therebetween. A spring 113 urges the piston 96 upward in the bore 106 and a spring 115 urges the piston 100 downward in the bore 106. The springs 113 and 115 therefore urge the respective half bands 74 and 76 toward a disengaged position. The cavity 114 is in fluid communication with the transmission electro-hydraulic control by a passage 116 such that the cavity 114 can be pressurized as required by the transmission operation. The piston 102 has an annular seal 118 that sealingly engages in a bore 120 formed in the housing 86 to cooperate therewith to create a cavity 122 which is in fluid communication with the electro-hydraulic control through a passage 124. The passage 116 and 124 are interconnected. A spring 126 urges the piston 102 downward in the bore 120 to thereby urge the half band 76 toward a disengaged position.

When the passages 116 and 124 are pressurized, the pressure in the cavity 114 urges the piston 96 downward and the piston 100 upward, as viewed in FIGS. 4 and 5. The downward movement of the piston 96 is transferred to the anchor 88 through the rod 94 and the upward movement of the piston 100 is transferred to the anchor 90 through the rods 98. The apply force supplied the half band 74 by the piston 96 is grounded by the pintle 82 against the housing 86. The pressure in the cavity 122 urges the piston 102 upward such that an upward force is imposed on the anchor 92 through the rod 104.

The anchor 90 is essentially a grounding point for the half band 76 when the drum is attempting to rotate counterclockwise as seen in FIG. 5. The combination of forces supplied by the pistons 96 and 100 provide a system wherein the pressure is proportional to the torque being transferred by the half bands 74 and 76. The pressure is regulated to maintain the position of the anchor 90 by a conventional pressure regulator, not shown. This helps reduce drive path disturbances during a ratio interchange. The pintle 82 reacts against the housing 86 and the two half bands 74 and 76 are brought into controlled frictional engagement with the drum 78 to thereby arrest rotation of the drum 78 and the sun gear member 42. By controlling the pressure rise in the cavities 114 and 122, the frictional engagement of the half bands 74 and 76 is controlled and the sun gear member 42 will take up the torque reaction imposed thereon at a controlled rate thereby enabling a controlled launch of the vehicle. The use of a half band allows a stiffer control system as the band thickness can be increased without significantly disturbing the friction surface load distribution.

The pressure in passages 116 and 124 can be regulated by the position of the rods 98 to supply the pressure needed to maintain the position of the band 76. This pressure then increases with increased torque and decreases with decreased torque to aid control of apply and release of the band 76. The double servo results in very low net radial forces which decrease the need for a stationary pilot on the drum 78. In the alternative, the anchor 90 can be supported on the transmission housing 86 and the piston 108 rods 98 and the spring 115 would be eliminated.

What is claimed is:

1. A power transmission for use in a powertrain having an engine for providing rotary power in a first directional sense to the transmission, said transmission comprising:
   an input shaft continuously connected with the engine for co-rotation therewith;
   an output shaft;
   a first planetary gear set having a first member drivingly connected with said input shaft for co-rotation therewith, a second member, and a third member;
   a second planetary gear set having a first member continuously connected with said second member of said first planetary gear set, a second member, and a third member;
   a third planetary gear set having a first member continuously connected for common rotation with said second member of said second planetary gear set, a second member connected for common rotation with said third member of said second planetary gear set, and a third member continuously connected for common rotation with said output shaft;
   a first selectively operable torque transmitting mechanism including a drum member continuously connected with said second member of said first planetary gear set and being controllably operated to engage a plurality of band members with said drum to establish said second member as a reaction member in said first planetary gear set to thereby establish said third member as an output member of said first planetary gear set for delivering output torque and rotation in the same directional sense as the engine during launch establishing ratios in both a first forward launch ratio and a reverse launch ratio;
   a second torque transmitting mechanism selectively, operatively engageable with and restraining rotation of said third member of said second planetary gear set and being fully engaged prior to said controlled engagement of said first torque transmitting mechanism to establish the reverse launch ratio between said input shaft and said output shaft;
   a third torque transmitting mechanism selectively, operatively engageable with and restraining rotation of said second member of said second planetary gear set and being fully engaged prior to said controlled engagement of said first torque transmitting mechanism to establish the first forward launch ratio between said input shaft and said output shaft.

2. The power transmission for use in a powertrain having an engine for providing rotary power in a first directional sense to the transmission, said transmission defined in claim 1 further comprising:
   each of said plurality of band members comprising approximately a half wrap on said drum when fully engaged.

3. A power transmission for use in a powertrain having an engine for providing rotary power to the transmission, said transmission comprising:
   an input shaft continuously drivingly connected with the engine for rotation therewith;
   an output shaft;
   a first planetary gear set having a first member, a second member, and a third member, said first member being continuously drivingly connected with said engine through said input shaft;
   a first selectively engageable torque transmitting mechanism operatively connected with said second member of said first planetary gear set and being controllably engageable to establish said second member as a reaction member in said first planetary gear set to thereby establish said third member as an output member of said first planetary gear set for delivering output torque therefrom during launch establishing ratios in both a first forward drive ratio and a reverse drive ratio;
   a second planetary gear set connected in downstream powerflow relation of said first planetary gear set and between said first planetary gear set and said output shaft for further modifying the torque output of said first planetary gear set;
   a third planetary gear set connected in downstream powerflow relation with said first planetary gear set and being interconnected with said second planetary gear set, said third planetary gear set having at least first and second members with said second member being continuously connected with said output shaft;
   a second selectively engageable stationary torque transmitting mechanism operatively connected with a first member of said second planetary gear set;
   a third selectively engageable stationary torque transmitting mechanism operatively connected with said first member of said third planetary gear set; and
   said second torque transmitting mechanism being selectively fully engaged prior to selective engagement of said first torque transmitting mechanism during said reverse drive ratio, said third torque transmitting mechanism being selectively fully engaged prior to selective engagement of said first torque transmitting mechanism during said first forward drive ratio, and both of said second and third planetary gear sets being active in combination with said first planetary gear set to establish said reverse drive ratio and said first forward drive ratio.

* * * * *